US009635835B1

(12) United States Patent
West

(10) Patent No.: US 9,635,835 B1
(45) Date of Patent: May 2, 2017

(54) APPARATUS FOR DISPENSING GAME FEED AND SUPPLEMENT

(71) Applicant: Mark West, Union, KY (US)

(72) Inventor: Mark West, Union, KY (US)

(*) Notice: Subject to any disclaimer, the term of this patent is extended or adjusted under 35 U.S.C. 154(b) by 0 days.

(21) Appl. No.: 15/297,689

(22) Filed: Oct. 19, 2016

(51) Int. Cl.
  A01K 5/00 (2006.01)
  A01K 5/02 (2006.01)

(52) U.S. Cl.
  CPC ............ A01K 5/004 (2013.01); A01K 5/0225 (2013.01)

(58) Field of Classification Search
  CPC .......... A01K 5/0225; A01K 5/02; A01K 5/00; A01K 5/0216; A01K 5/0258; A01K 5/0266; A01K 5/0291; A01K 61/80; A01K 7/02
  USPC ........... 119/57.1, 57.91, 51.02, 51.11, 51.13, 119/52.4, 56.1, 57.4, 57.92
  See application file for complete search history.

(56) References Cited

U.S. PATENT DOCUMENTS

| 3,727,584 | A | * | 4/1973 | Permann | ............. | A01K 5/0225 |
| | | | | | | 119/56.1 |
| 3,952,705 | A | | 4/1976 | Witmer et al. | | |
| 4,162,683 | A | | 7/1979 | Brooks | | |
| 4,651,679 | A | | 3/1987 | Fassauer | | |
| 5,259,336 | A | | 11/1993 | Clark | | |
| 5,346,710 | A | | 9/1994 | Geitner | | |
| 5,740,757 | A | * | 4/1998 | Smeester | ............. | A01K 5/00 |
| | | | | | | 119/51.02 |
| 6,557,598 | B2 | * | 5/2003 | Glover | ............. | A01K 61/80 |
| | | | | | | 141/18 |
| 6,763,781 | B1 | | 7/2004 | Norrell | | |
| 7,404,376 | B2 | * | 7/2008 | Hernandez | ............. | A01K 5/0225 |
| | | | | | | 119/51.13 |
| 7,735,454 | B1 | * | 6/2010 | Stoppelberg | ............. | A01K 5/0225 |
| | | | | | | 119/52.4 |
| 8,307,785 | B2 | | 11/2012 | Zimmerman et al. | | |
| 8,353,260 | B1 | | 1/2013 | Westrand | | |
| 8,453,601 | B2 | | 6/2013 | Zimmerman | | |
| 9,192,148 | B1 | | 11/2015 | Hill | | |
| 2005/0284386 | A1 | * | 12/2005 | Eversole | ............. | A01K 5/0258 |
| | | | | | | 119/57.1 |
| 2015/0327510 | A1 | * | 11/2015 | Romero | ............. | A01K 5/0225 |
| | | | | | | 119/51.11 |

* cited by examiner

Primary Examiner — Yvonne Abbott-Lewis
(74) Attorney, Agent, or Firm — Wm. Cates Rambo

(57) ABSTRACT

A feeder basically comprises a housing having a feed compartment, a supplement compartment, a supplement conduit, a pump for moving the supplement through the conduit, a motor and an electrical source for energizing the pump and the motor; an external impeller driven by the motor for distributing the feed; and an external opening in the supplement conduit for directing the supplement towards the feed distributed by the impeller.

8 Claims, 1 Drawing Sheet

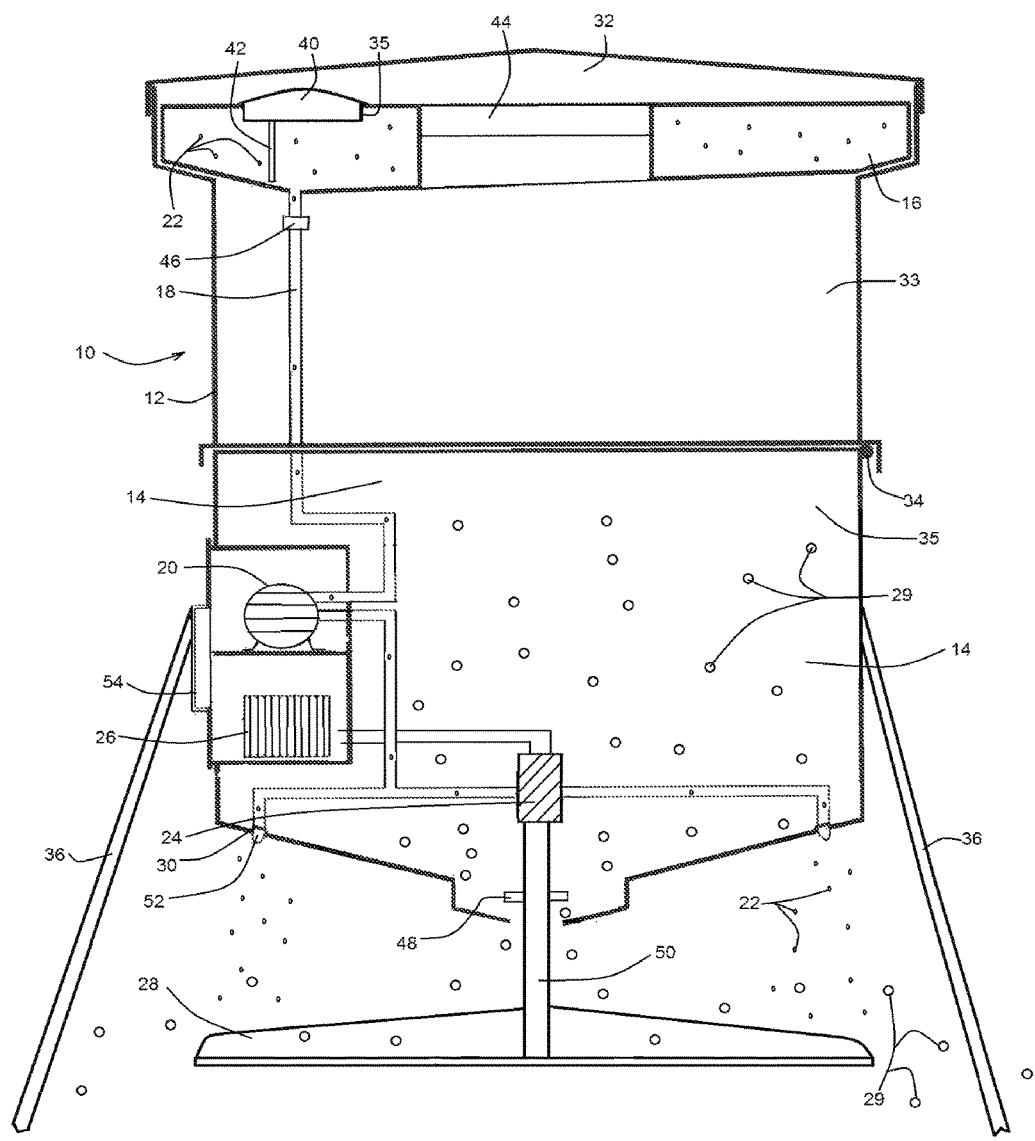

APPARATUS FOR DISPENSING GAME FEED AND SUPPLEMENT

TECHNICAL FIELD

The present invention relates to portable game feeders, and more particularly to those adapted to dispense additional edible substances.

BACKGROUND ART

In the past, portable feeders for wild game or farm animals have been designed to dispense solid nutrients and other substances, but separately. The equipment was not designed to add the additional substance to the feed. The basic problem the present invention addresses is making the feed more attractive to animals. This objective is particularly useful with wild game, such as deer, which are wary of approaching man made equipment and which may be attracted to some flavoring or scents and not to others, depending upon location, season, age and the like.

SUMMARY

The feeder basically comprises a housing having a feed compartment, a supplement compartment, a supplement conduit, a pump for moving the supplement through the conduit, a motor and an electrical source for energizing the pump and the motor; an external impeller driven by the motor for distributing the feed; and an external opening in the supplement conduit for directing the supplement towards the feed distributed by the impeller.

DRAWINGS

The FIGURE is a sectional view of an illustrative embodiment of the present feeder.

DESCRIPTION OF ILLUSTRATIVE EMBODIMENT

The present feeder, generally designated 10, may include a housing 12 having a feed compartment 14, a supplement compartment 16, a supplement conduit 18, a pump 20 for moving the supplement 22 through the conduit, a motor 24 and an electrical source 26 for energizing the pump and the motor; an external impeller 28 driven by the motor for distributing the feed 29; and an external opening 30 in the supplement conduit for directing the supplement 22 towards the feed 29 distributed by the impeller.

The feed 29 may be in the form of man-made food nuggets or pellets or it may be corn and/or other grains suitable for wild game such as deer. The supplement 22 may be a liquid scent and/or flavor, such as apple, suitable for the game.

Preferably, the housing 12 is generally barrel-shaped, is formed from an aluminum alloy or a synthetic resin and generally defines the feed compartment 14. Typically, it includes a removable lid 32, upper 33 and lower 35 chambers joined by a hinge 34 approximately half way down the housing to provide access to the motor 24, and a set of spaced apart legs 36 extending angularly and downwardly from the housing for mounting the feeder 10 above the ground.

The supplement compartment or reservoir 16 may be mounted in the housing 12 below the lid 32 for ease of access and may be provided with an upper fill hole 38 equipped with a rubber plug 40 with a dip stick 42. Preferably, the reservoir is doughnut shaped and provided with a sloped bottom to assist in complete draining. The central opening 44 may be large enough to permit the user to reach under the reservoir, disconnect it at a coupling 46 with the conduit 18 and remove it from the housing 12 for cleaning. Preferably a check valve is provided on the reservoir side of the coupling 46 to keep the supplement 22 from dripping out when disconnected from the conduit.

An interior agitator 48 may be mounted on a shaft 50 extending downwardly from the motor 24 to prevent the feed 29 from clogging an outlet 52 in the bottom of the housing 12, so that the feed flows smoothly by force of gravity onto the external impeller 28.

Preferably the supplement conduit 18 disposed on an output side of the pump 20 extends to two or three outlets 30 on the bottom of the housing. The outlets may be provided with check valves and nozzles 52 to prevent the supplement from leaking and to direct it in a spray onto the feed being distributed by the exterior impeller 28.

A timer 54 may be mounted on the housing and electrically connected to the pump and the motor for activating the feeder at selected times.

The invention claimed is:

1. Apparatus for distributing game feed and a supplement, said apparatus comprising:
   a. a housing having a feed compartment, a supplement compartment, a supplement conduit, a pump for moving the supplement through the conduit, a motor and an electrical source for energizing the pump and the motor;
   b. an external impeller driven by the motor for distributing the feed; and
   c. an external outlet in the supplement conduit disposed to direct the supplement towards the feed distributed by the impeller.

2. The apparatus according to claim 1, wherein the housing generally defines the feed compartment.

3. The apparatus according to claim 1, wherein the housing comprises an upper chamber and a lower chamber, said upper chamber being hingedly mounted on said lower chamber.

4. The apparatus according to claim 3, wherein the supplement compartment is removably mounted in the upper chamber of the housing.

5. The apparatus according to claim 1, wherein a drive shaft extends from the motor to the external impeller, said drive shaft having a feed agitator disposed inwardly of a lower end of the housing.

6. The apparatus according to claim 1, wherein the supplement conduit is provided with a plurality of external outlets.

7. The apparatus according to claim 6, wherein each of the external outlets is provided with a check valve and a nozzle.

8. The apparatus according to claim 1, wherein a timer is mounted on the housing, said timer being electrically connected to the pump and the motor for activating said apparatus at selected times.

* * * * *